Sept. 24, 1968    A. L. WHITMAN, JR    3,403,320
VOLTAGE REGULATOR WITH CURRENT OVERLOAD PROTECTION
Filed March 26, 1964                                    2 Sheets-Sheet 1

INVENTOR.
ALLEN LEE WHITMAN, JR.
BY
Roberts, Cushman & Grover,

United States Patent Office 3,403,320
Patented Sept. 24, 1968

3,403,320
VOLTAGE REGULATOR WITH CURRENT OVERLOAD PROTECTION
Allen Lee Whitman, Jr., Lexington, Mass., assignor to Gorham Corporation, Providence, R.I., a corporation of Rhode Island
Filed Mar. 26, 1964, Ser. No. 354,966
11 Claims. (Cl. 323—4)

ABSTRACT OF THE DISCLOSURE

A voltage regulator, with a transistor current source in series with a load whose voltage is to be regulated, includes a forward biased diode and series resistor connected in parallel with the load. A transistor complementary to the transistor current source is responsive to the voltage at the junction of the diode and resistor together with a fixed voltage, and supplies a signal current to regulate the transistor current source. When the load current reaches a critical value, the diode becomes back-biased to terminate regulation, preventing current from increasing further and thereby preventing overloading.

---

The field of this invention relates broadly to voltage regulators and more particularly to a transistor voltage regulating circuit which is protected from damage caused by the occurrence of short circuits in the loads applied thereto.

For providing good voltage regulation over a wide range of current loads, a series type of regulator is generally preferable over shunt types. However, one problem which does exist in conventional circuits of this type is that of heavy current loads necessarily creating high power dissipation in the series transistor; a short circuit in the load may quickly and completely damage the series transistors by way of this power dissipation, and control transistors are likewise exposed to severe damage. It has been proposed to provide a series fuse or circuit breaker to protect the series regulating element but, in the case of transistor circuitry, these elements may not operate quickly enough especially if thermal runaway should develop. Also, such protective devices require cumbersome replacement or resetting to place the regulator in operation again.

Objects of the present invention are accordingly to provide a series type voltage regulating circuit which is inherently protected from overload currents and which automatically returns from emergency to normal regulating service once an overload is; to provide such a circuit which, during normal operation, presents a very low source impedance to the load and which, under overload emergency conditions, functions as a constant current or high impedance source; and to provide such a circuit which is very stable, which is of simple and inexpensive construction, and which is highly reliable in operation.

The substance of the invention may be shortly stated as involving, in a series type of transistor voltage regulator wherein a signal current is derived which is a function of the output voltage, and this signal current is amplified and applied to the load in a sense tending to reduce the error. According to the present invention, the error signal is limited by drawing the signal current from the junction between a diode and a current determining impedance which are connected across the output of the regulator.

In a more specific aspect the invention involves a voltage regulator for use between a power source and a load which regulator includes a current amplifier, the output of which is in series with the source and the load, a diode, a current determining impedance in series with the diode, and voltage reference means. The diode and impedance together are in parallel with the load with the diode being forward biased with respect to the supply voltage. The voltage reference means are operative to supply a signal current to the current amplifier which signal current is generally proportional to the difference in voltage between the output voltage of the regulator and a voltage of fixed value; substantially all of the signal current is drawn from a junction between the diode and said current determining impedance.

In another specific aspect the voltage regulator according to the invention has as the current amplifier a first transistor arranged with its emitter collector circuit in series with the source and the load, the collector being connected to the load; the current determining impedance in series with the diode is a preferably adjustable resistor, diode and resistor together being in parallel with the load. The voltage reference means includes a second transistor, complementary in type to the first transistor, arranged with its emitter connected to the junction between the diode and the current determining impedance, with its collector connected to the base of the first transistor, and to its base applied an output voltage responsive signal current of proper polarity to stabilize the output voltage of the regulator by the operation of the first and second transistors.

Other objects and advantages, inventive aspects, and details of preferred construction will appear from the following description of several typical practical embodiments.

The description refers to drawings in which.

Figure 1:
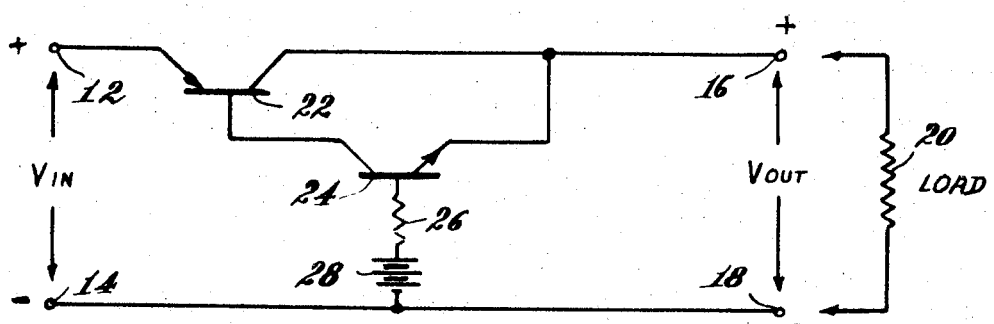
FIG. 1 is a schematic circuit diagram of a conventional series voltage regulator.

For purposes of describing the principle and operation of the present invention, a known voltage regulator will be first described with reference to FIG. 1. In this figure, the input terminals 12 and 14 are connected to an unregulated voltage source and a constant predetermined voltage is derived at output terminals 16 and 18 to which a load 20 can be applied. The regulating voltage drop appears across the emitter-collector circuit of a PNP transistor 22 which must therefore dissipate power equal to that voltage drop multiplied by the current drawn by the load 20.

Control or signal current for the transistor 22 is supplied by the collector circuit of a transistor 24 of an NPN type complementary to that of PNP transistor 22. The emitter of the NPN transistor 24 is connected to the positive output terminal 16 of the regulator and its base is connected, through a current limiting resistor 26, to means defining a fixed voltage value, here for example a battery 28. The regulator output voltage and the reference voltage are compared in the emitter-base circuit of the transistor 24 and the amplified emitter-collector current through 24, constituting a signal current, is substantially proportional to the voltage difference between the reference battery 28 and the output voltage from the regulator. This signal current is applied to the base of transistor 22 and produces an amplified current change in the emitter-collector circuit of that transistor 22 and in the load 20, in a sense appropriate for decreasing the output voltage error. The resistor 26 protects the transistor 24 by limiting its base current and it also determines the effective gain of the control loop, and hence the effective output impedance of the regulator. Thus, the component group 24, 26, 28 is in effect a voltage reference means.

While the device illustrated in FIG. 1 provides excellent regulation over a reasonably wide range of load fluctuation, overload currents such as might be caused by a short circuit in the load 20, can become very detrimental in this and similar circuits, quickly burning out transistors. Referring for example to the circuit to FIG. 1, under short-circuit conditions a large current will flow from the emitter to the base of 22 and to the short via the collector-emitter path of 24 which, usually being a low power device, will burn out quickly. A surge limiting resistor between the base of 22 and the collector of 24 restricts the operating range and is otherwise unsatisfactory. Similarly an amplified current flows through the emitter-collector circuit of transistor 22 and can quickly destroy it.

Figure 2:
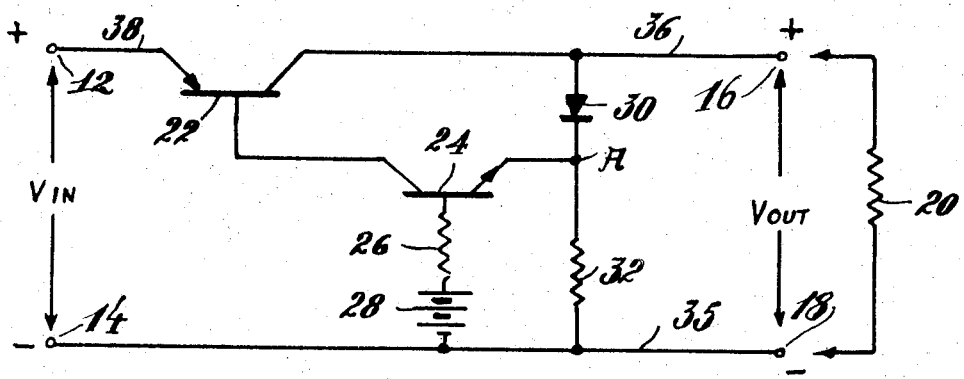
FIG. 2 is a schematic circuit diagram of a similar series voltage regulator incorporating the invention.

The present invention contemplates controlling the power dissipation to which the transistor 22 can be subjected by placing a limit on the signal current. This improved circuit is shown in FIG. 2. It is similar to that shown in FIG. 1 except that a diode 30 and a resistor 32 are connected in series across the output of the regulator, the emitter of the transistor 24 being connected to the junction A between the diode and the resistor. The resistor 32 is an example for a current determining impedance or current limiting means in general. The diode 30 is forwardly biased, as shown, so that the output voltage tends to pass current through 30 and resistor 32 in series. The controlling or signal current passes from the base of the power transistor 22 through the collector-emitter circuit of the controlling transistor 24 to the junction A. This is the major portion of the emitter current of 24. It will be noted that, although the emitter of 24 is essentially at the same potential as the emitter of 24 in FIG. 1, the control current flows from emitter 24 to the negative lead 36 through resistor 32 rather than to the output lead 35, being blocked by diode 30. This maintains a small essentially constant voltage drop on the forward biased diode between output and junction A. This normal operating condition corresponds to that prevailing in the conventional circuit according to FIG. 1 and the above discussed regulation takes place. During such regulation, the essentially constant current through the resistor 32 is composed of those through the emitter of the transistor 24 and through the diode 30, the diode taking whatever portion of the total is not required as signal current by the transistor 24. The condition for maintaining the emitter of the transistor 24 at the potential of the positive output terminal 16, for proper regulation, is that the emitter current of 24 must not exceed the regulator output voltage divided by the resistance value of the resistor 32. So long as the emitter current is below this value the total current through the resistor 32 is held at a constant value by current passing through the diode 30 in the forward direction.

If, however, under short circuit conditions the load resistance is reduced to zero, the signal current, namely the emitter current from the transistor 24 tends to increase above the value determined by resistor 32 thereby causing a reverse bias of the diode 30 which thereupon acts as if it were a switch being opened. The diode will cease to have any effect on the circuit so that the emitter of 24 will be free to attain voltages more positive than that at the output terminal 16. The effect of the resistor 32 alone in the emitter circuit of the transistor 24 is highly degenerative and both transistors will approach constant current operation. The current flowing through 32 now comes only from the emitter of 24 and causes the output current to be limited to a value approximately $V/R(1-a)$ wherein V is the voltage of battery 28, R the resistance of 32, and $a$ the common emitter current gain of 22. This output current can easily be adjusted to a safe value for 22 to handle. Since 24, the battery voltage and 32 limit the base current of 22, the circuit is now essentially a conventional current regulator.

This operation of the diode 30 in providing the transition between normal voltage regulation and emergency constant current regulation can be considered to be that of switching the approximately constant current passed by the resistor 32. As pointed out above, during normal operation the resistor 32 carries the emitter current of 24 and the current through the diode 30. When, under short circuit conditions, the emitter current of the transistor 24 exceeds the level predetermined by the resistor 32 the diode 30 becomes back-biased thus effectively disconnecting one of the two voltages which are compared in the emitter-base-battery circuit of the transistor 24. The value of the resistor 32 thus provides a convenient means for adjusting the transition point between the two modes of operation.

Figure 3:
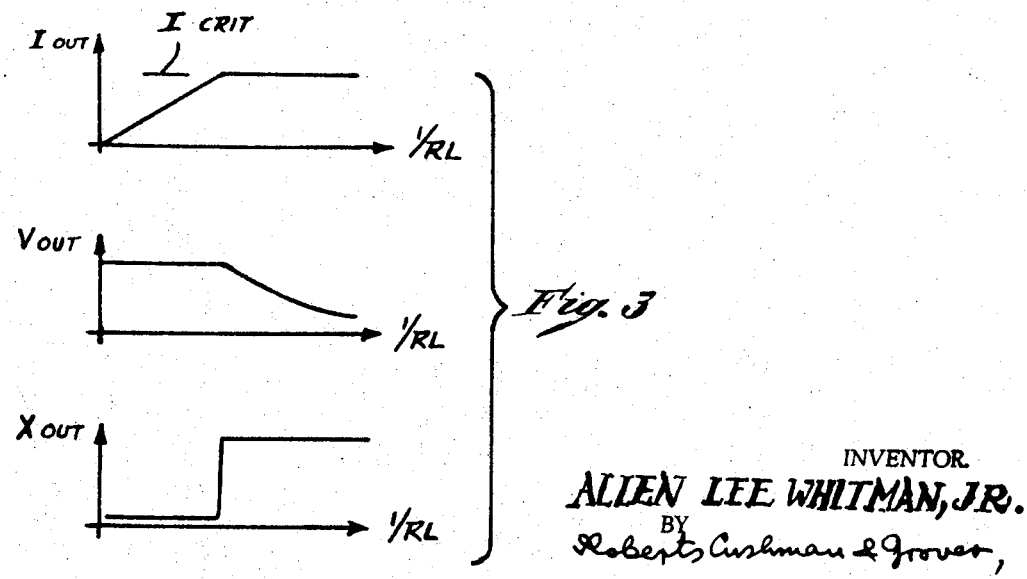
FIG. 3 illustrates graphically the operation of the circuit of FIG. 2.

The effect of the transition is illustrated by the graphs of FIG. 3 in which the output voltage from the regulator "V out," the load current drawn "I out," and the regulator output impedance "X out" are plotted against increasing load as represented by the inverse of the load resistance "RL." It will be seen that the output voltage is essentially constant, that the output impedance is low, and that the current drawn rises to meet the demand until a critical value of output current "I crit" is reached which corresponds to the value chosen for the resistor 32. From this point on, the current remains essentially constant but the output voltage drops with decreasing load resistance. The effective output impedance is correspondingly high.

Figure 4:
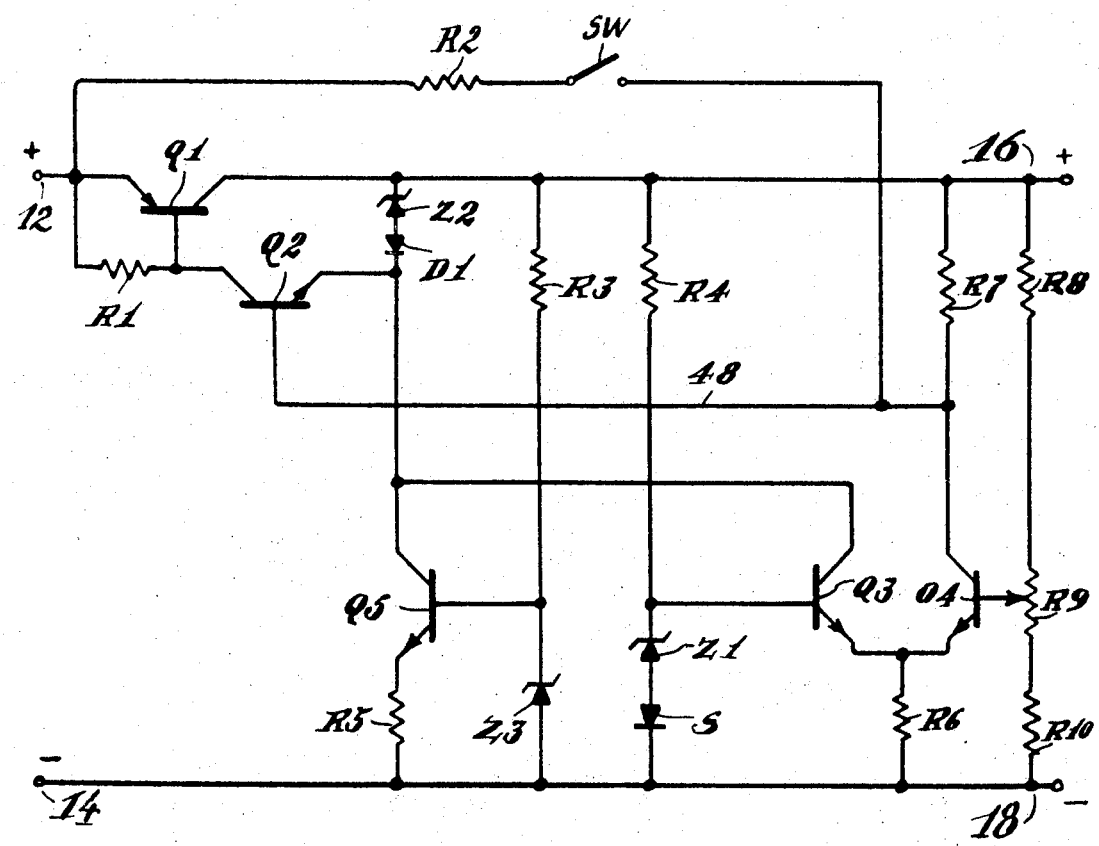
FIG. 4 is a schematic circuit diagram of a presently preferred version of the regulator according to FIG. 2.

A presently preferred embodiment of the invention incorporating several refinements in addition to the above-described circuitry according to the invention, is illustrated in detail in FIG. 4. The nature and electrical connections of the circuit components are clearly shown in this schematic and the ratings or conventional designations for the components, so far as material for the proper operation of the device, are given in the following table based on the reference characters in FIG. 4. It should be understood that adjustments and corrections may have to be applied upon initial testing for proper performance according to routine practice in the manufacture of devices of this type.

TABLE

| | |
|---|---|
| Transistor Q1 | 2N1038 |
| Transistor Q2 | 2N1613 |
| Transistor Q3, Q4, Q5 | 2N338 |
| Diode D1 | 1N645 |
| Zener diode Z1 | 1N709 |
| Zener diode Z2 | 1N708 |
| Zener diode Z3 | 1N714 |
| Stabistor diode S | 1N912 |
| Switch SW | SPST |
| Resistor R1 _____ohms__ | 150 |
| Resistor R2 _____do____ | 100,000 |
| Resistor R3, R4 _____do____ | 2,200 |
| Resistor R5 _____do____ | 680 |
| Resistor R6, R8 _____do____ | 1,000 |
| Resistor R7 _____do____ | 5,600 |
| Potentiometer R9 _____do____ | 5,000 |
| Resistor R10 _____do____ | 510 |

With the components designated above, the circuit shown in FIG. 4 will give excellent voltage control for load currents up to 700 milliamperes at which point the voltage regulation ceases completely. The regulated output voltage may be adjusted in the region of 22 volts by means of the potentiometer R9.

Among the refinements incorporated into regulators such as illustrated in FIG. 4 are the following:

The standard reference voltage provided in FIG. 2 by the battery 28 is here provided by a Zener diode Z1 which is rendered relatively insensitive to temperature variations by the use of a forward-biased temperature compensating diode 5 of the type known as a stabistor. The reference voltage is compared with a portion of the output voltage, adjustable by means of the potentiometer R9, in a conventional differential amplifier circuit involving the transistors Q3 and Q4. The output signal from the differential amplifier is applied to the base of the NPN transistor Q2 through the line 48 providing a greater control loop gain than the circuit of FIG. 2 and thereby tightening the control of the output voltage. Since the comparision between output and reference voltages is not made in the transistor Q2 stage, the circuit of FIG. 4 can also be analyzed as being a cascade current amplifier in which the current supply for one stage is taken from a diode-current source junction. This analysis is consistent with that previously given since the current output from each stage of the cascade amplifier is the signal current for the next stage.

The circuit of FIG. 4 also has a Zener diode Z2 in series with the current switching diode D1 corresponding to the diode 30 according to the invention, of FIG. 2. This Zener diode does not affect the operation of the circuit in its inventive aspects as above described but provides a fixed voltage drop from the positive output terminal of the regulator thereby increasing the collector supply voltage to the transistor Q2.

As explained above, the transition from voltage regulating operation to current limited operation can be understood to be caused by the sharing of an essentially constant current by the emitter of Q2 and the switching diode D1 corresponding to 24 and 30 of FIG. 2. In the circuit of FIG. 4 the degree to which this current approximates a constant level is improved by replacing the resistor 32 in the circuit of FIG. 2, by a transistor circuit involving an NPN transistor Q5 and a Zener diode Z3 and resistor R5. The high output impedance presented by the collector of the transistor Q5 approximates closely a constant current source.

Because of the high control loop-gain and the fact that the differential amplifier (Q3, Q4) obtains its supply voltage from the output terminals of the regulator, the device shown in FIG. 4 may not be self-restarting with certain loads. The resistor R2, which can supply current to the collector of Q4 and the base of Q2 by bridging Q1, provides a means for restarting the circuit after its collapse from overcurrent loads. This resistor R2 can be left in the circuit permanently without substantial detrimental effect or, if nonautomatic restarting is desirable, can be inserted as desired by means of the switch SW.

It will be apparent to those skilled in the art that the various refinements discussed above may be applied substantially independently and that one or more thereof can be omitted independently of the others as dictated by the other requirements of the particular application for the regulator.

It should be understood that this disclosure is for the purpose of illustration only and that the invention includes all modifications and equivalents falling within the scope of the appended claims.

I claim:

1. A voltage regulator for use between a power source and a load comprising:
   a current amplifier the output of which is in series with the source and the load;
   a diode;
   a current determining impedance in series with said diode, said diode and impedance together being in parallel with the load, the diode being forward biased with respect to the supply voltage; and
   voltage reference means including means defining a fixed voltage value and operative to supply a signal current to said current amplifier which signal current is essentially proportional to the difference in voltage between the output voltage of the regulator and said fixed voltage value, such that substantially all of said signal current is drawn from the junction between said diode and said current determining impedance.

2. Regulator according to claim 1, wherein said current amplifier is a cascade current amplifier connected in series with the source and the load.

3. A voltage regulator for use between a direct current power source and a load comprising:
   a diode;
   current determining means in series with said diode, said diode and said current determining means together being in parallel with the load, with said diode being forward biased with respect to the supply voltage;
   a cascade transistor current amplifier having alternate stages of complementary type transistors, the output of said amplifier being in series with the source and the load; and
   means for taking the emitter current for at least one of the stages of said cascade amplifier from the junction between said diode and said current determining means.

4. A voltage regulator for use between a direct current power source and a load comprising:
   a diode;
   current determining means in series with said diode, said diode and said current determining means together being in parallel with the load with said diode being forward biased with respect to the supply voltage;
   a first transistor arranged with its collector on the load and its emitter collector circuit in series with the source and the load;
   a second transistor, complementary in type to said first transistor, with its emitter connected to the junction between said diode and said current determining means and with its collector connected to the base of said first transistor; and
   voltage reference means connected to the base of said second transistor.

5. A voltage regulator according to claim 4 in which said voltage reference means is a Zener diode.

6. A voltage regulator for use between a direct current power source and a load comprising:
   a diode forward biased with reference to said source;
   current determining means in series with said diode, said diode and said current determining means together being in parallel with the load;
   a first transistor arranged with its emitter-collector circuit in series with the source and the load, the collector being connected to the load;
   a second transistor, complementary in type to said first transistor, arranged with its emitter connected to the junction between said diode and said current determining means with its collector connected to the base of said first transistor; and
   control signal means for applying to the base of said second transistor an output-voltage-responsive signal current of the polarity which causes said first and second transistors to stabilize the output voltage of the regulator.

7. A voltage regulator according to claim 6 in which said control signal means is a differential amplifier circuit including a fixed voltage element connected to one of its inputs and a portion of the output voltage of the regulator connected to the other of its inputs.

8. A voltage regulator according to claim 7 in which said fixed voltage element is a Zener diode.

9. A voltage regulator according to claim 6 including conductive means bridging said first transistor for applying current to the base of said second transistor independently of said control signal means.

10. A voltage regulator according to claim 6 in which said current determining means include a transistor having a high collector output impedance, said diode being connected to the collector of said transistor for utilizing said high impedance as a constant current source.

11. A voltage regulator according to claim 6 including means for providing a fixed voltage drop in series with said diode.

References Cited
UNITED STATES PATENTS

| | | | |
|---|---|---|---|
| 3,263,156 | 7/1966 | Isaacs | 323—9 |
| 3,235,787 | 2/1966 | Gordon et al. | 323—22 |
| 3,207,973 | 9/1965 | Smith | 323—22 |
| 3,174,094 | 3/1965 | Farnsworth et al. | 323—22 |
| 3,123,759 | 3/1964 | Grey | 323—22 |
| 3,080,516 | 3/1963 | Bixby et al. | 323—22 |
| 2,994,029 | 7/1963 | Bixby | 323—22 |
| 2,903,640 | 9/1959 | Bixby | 323—22 |
| 3,237,087 | 2/1966 | Greenberg | 323—22 |
| 3,109,980 | 11/1963 | Wiley | 323—22 |
| 3,101,441 | 8/1963 | Curry | 323—22 |

ORIS L. RADER, *Primary Examiner.*

H. HUBERFELD, *Assistant Examiner.*